H. H. SAWTELL.
AIR COMPRESSOR.

No. 183,596. Patented Oct. 24, 1876.

WITNESSES:
C. Neveux
John Goethals

INVENTOR:
H. H. Sawtell
BY
ATTORNEYS.

UNITED STATES PATENT OFFICE.

HENRY H. SAWTELL, OF RANDOLPH, NEW YORK.

IMPROVEMENT IN AIR-COMPRESSORS.

Specification forming part of Letters Patent No. 183,596, dated October 24, 1876; application filed May 22, 1876.

*To all whom it may concern:*

Be it known that I, HENRY H. SAWTELL, of Randolph, Cattaraugus county, and State of New York, have invented a new and Improved Air-Compressor, of which the following is a specification:

My invention relates to the construction and arrangement of air-compressors, composed of a couple of cylinders to be alternately filled and emptied of water and air, together with valve mechanism for letting on and shutting off water, and opening and closing the exhaust; and the object is to provide a simple and cheap contrivance of the same.

Figure 1:
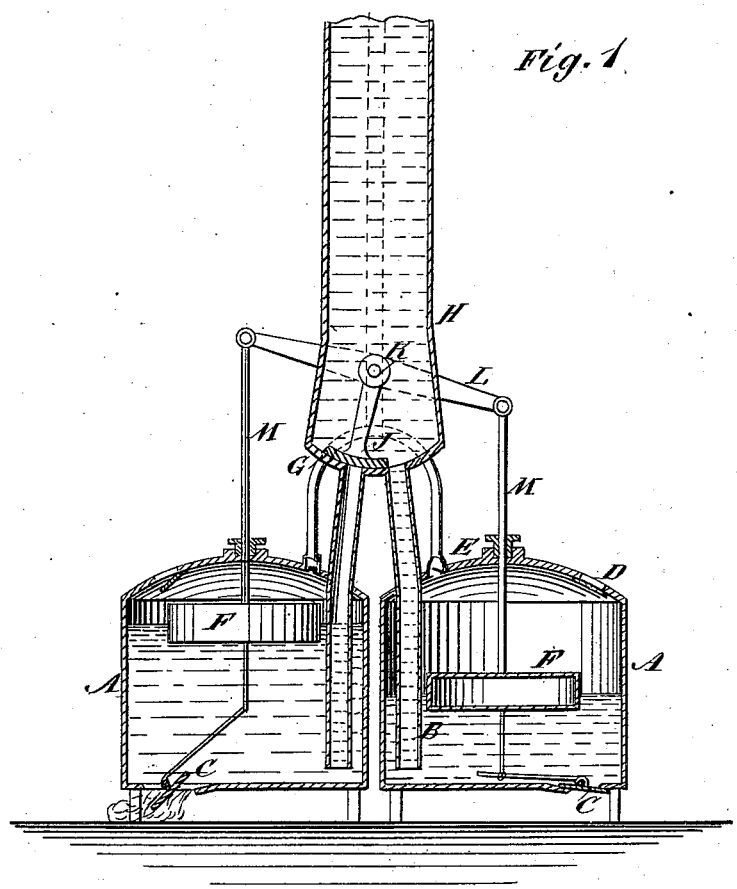
Figure 2:
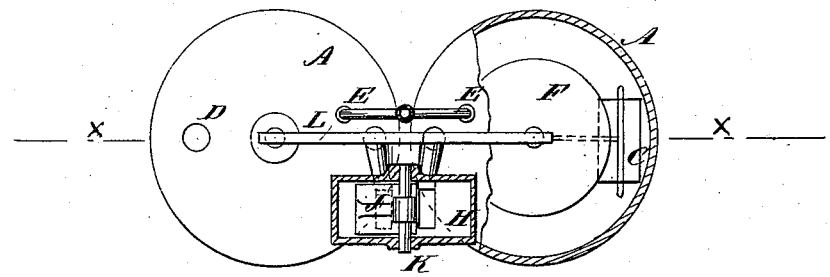

In the accompanying drawing, Figure 1 is a sectional elevation of my improved air-compressor, taken on the line X X, of Fig. 2; and Fig. 2 is partly a plan view and partly a horizontal section.

In the drawing, A represents two cylinders side by side, having an inlet-pipe, B, and an outlet-valve, C, for water; also an inlet, D, and outlet E, for air, and containing a float, F. The pipes for admitting water extend from near the bottom of the cylinders to cut off the air, into the curved bottom G of a pen-stock, H, in which is a rock-valve, J, for alternately opening and closing the passages to the respective cylinders. The stem K of this valve extends out through the pen-stock in a suitable stuffing-box, and connects with a rocking beam, L, one end of which is connected to the float F of one of the cylinders by a rod, M, and the other is connected to the other float by a similar rod. The valves at C are so connected to the floats that, when they are raised by the water to the required height, the floats open them to let the water escape and reverse the machine. By the filling of the cylinders with water the air is forced out through outlet E into the receiver, and by the escape of the water the cylinders fill with air again, to be again expelled into the receiver.

The construction, it will be noted, is very simple and cheap; and the machine is calculated to be reliable and durable.

Having thus described my invention, what I claim as new, and desire to secure by Letters Patent, is—

The rock-valve J on the curved bottom of the pen-stock, water-inlet pipes B and floats F, combined with the pen-stock H, and with cylinders A, having outlet-valves for water connected to the floats, and also having the air inlet and outlet passages, substantially as herein shown and described.

HENRY H. SAWTELL.

Witnesses:
   C. P. ADAMS,
   IRA GRIGGS.